May 22, 1951     L. D. STATHAM     2,553,986
METHOD AND APPARATUS FOR TESTING THE
BONDING OF BONDED STRAIN GAUGES
Filed July 14, 1947
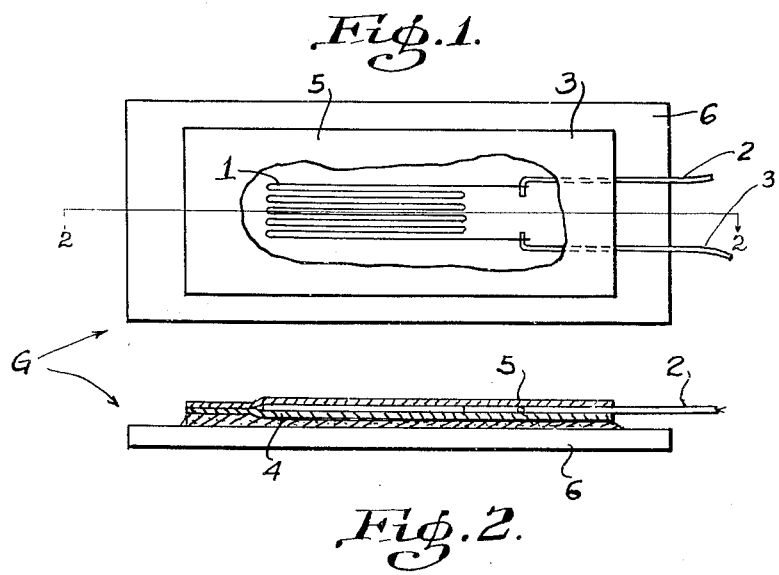
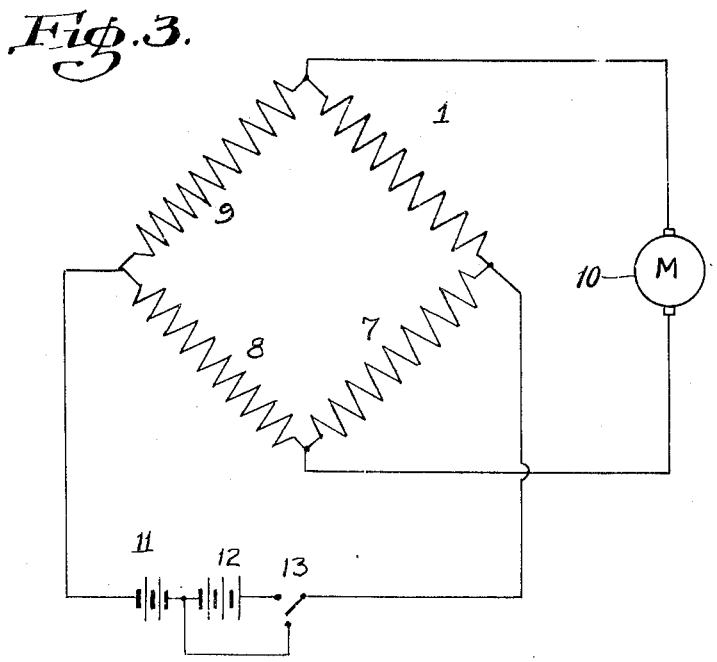
INVENTOR.
Louis D. Statham
BY
ATTORNEY.

Patented May 22, 1951

2,553,986

UNITED STATES PATENT OFFICE 2,553,986

METHOD AND APPARATUS FOR TESTING THE BONDING OF BONDED STRAIN GAUGES

Louis D. Statham, Beverly Hills, Calif., assignor to Statham Laboratories, Inc., Los Angeles, Calif., a corporation of California Application July 14, 1947, Serial No. 760,774

9 Claims. (Cl. 175—183)

This invention relates to a process and apparatus for the mounting and testing of strain wire gauges of the bonded type. Bonded strain wire resistance gauges consist essentially of a grid of fine wire, for example, wire having a diameter of 0.001″ cemented to a piece of thin paper and covered with a second paper for protection. Connecting leads of wire are soldered to the end of the grid. The grid may then be cemented to the surface of a member in which the strain is to be measured. Such gauges are well known and their method of cementing also well known.

The application of a stress to such a member results in a change in linear dimension of the surface upon which the gauge is cemented. The wire being bonded to the surface undergoing stress will also change in length in accordance with the strain of the surface to which it is applied. This change in length results in a change in resistance of the wires of the grid. The relation between the strain to which such a wire is subjected and the change in resistance is known as the "gauge factor." Thus, if the wires are subjected to a strain in elongation, the resultant change in length will cause an increase in resistance of the wire. However, if the wire is subjected to a strain in compression, the resultant diminution in length causes a decrease in resistance of the wire.

It is clear that in order for such a gauge to function to measure the strains in the surface to which it is applied, it is essential that the bond between the wire and the surface undergoing strain be firm so that there is no differential movement between the surface and the wire.

One of the great difficulties with the use of such bonded wire gauges is that there is no way of assuring that the cementing or the bonding of the wire resistance strain gauge to the surface to be tested is such that there is no differential movement, and therefore there is no way of assuring the accuracy of the gauge. This occurs with sufficient frequency to introduce an element of uncertainty into the test procedure and the bond between the wire gauge and the surface undergoing test is not so perfect and therefore the test results remain in doubt.

I have developed a method and apparatus for testing the adequacy of bonding of such a strain wire gauge. Therefore I may test a single wire gauge to determine whether or not the bond is perfect. Obviously, if the bond is found imperfect, it may be rebonded until a perfect bond is obtained.

If a rod or wire composed of such material is supported without constraint and heated, it will expand according to its coefficient of expansion. When such a wire is heated it will have its resistance changed according to its temperature coefficient of resistance. Thus if the rod has a positive temperature coefficient of resistance, the resistance will increase when the rod is heated; if the coefficient is negative, the resistance will decrease, and if the coefficient is substantially zero, the resistance will not change appreciably when the rod is heated. This variation in resistance in such rods or wires occurs, however, so long as the wire is not restrained and can increase in length according to its linear coefficient of expansion. However, if the rod or wire be bonded or partially bonded to a surface and is heated, for example, without similarly heating the base upon which it is cemented and is therefore constrained against expansion, this constraint will impose a compressive force upon the wire and the resistance of the wire will then go down; that is, the compressive force will impart a negative increment to this resistance. In the case of a negative temperature coefficient the resistance change will be negative, while if the temperature coefficient of resistance is positive, the change may be less positive, zero, or negative. If the temperature coefficient of resistance is zero the resistance will diminish. Thus, upon the application of heat to such a rod or wire which is adequately bonded, the resistance change will be the algebraic sum of the resistance change due to temperature and that due to the compressive force. If instead of heating the wire we chill the wire, then the reverse effect occurs.

If the wire is only partially bonded, then the resistance change will be intermediate that of the bonded and unbonded wire.

I may bond a number of similar strain wire gauges to a surface, taking due precaution to adequately and completely bond certain of them and deliberately forming an imperfect bond between others and a supporting surface. I may thermally raise the temperature of each gauge to the same degree by passing the same current for the same time through each gauge, since the gauges are of substantially the same resistance being formed of the same material and of the same cross sectional area and length. By limiting the duration of the current, the wires may be heated without materially changing the temperature of the supporting surface. The resistance is then measured immediately thereafter so that the temperature of the gauges suffers no substantial variation from that attained on heating.

By observing the change in resistance in the several bonded gauges, it will be observed that a number of them have suffered a like resistance variation. It may be that others have suffered a resistance change different from that obtained by the first group. The first group will be those which have been completely bonded, and the latter group those which have only been partly bonded. It is obvious that while it may be expected that some gauges will be completely bonded, and if so completely bonded will act in the same manner, the chances are exceedingly small that in the case of two or more partly bonded gauges the characteristics of the partial bond would be so indentical as to give closely similar resistance changes. This procedure will then establish a constant for the gauge, measured as the resistance change when subjected to the conditions of heating described above, which will make it possible to test whether such gauge, when cemented to a member whose strain is to be measured, is adequately cemented thereto.

This invention will be further described in connection with the drawing, in which Fig. 1 is a plan view with parts broken away showing the application of a bonded strain gauge to a specimen to be tested;

Fig. 2 is a section taken along the line 2—2 of Fig. 1; and

Fig. 3 is a schematic wiring diagram showing the aplication of my invention to such a gauge.

The gauges are composed of a grid of fine wire 1, for example, of wire having a substantially zero temperature coefficient of resistance, to which terminals 2 and 3 are connected, all glued between two pieces of thin paper 4 and 5. A number of such gauges similar in construction and resistance may be provided, cemented, by the usual cementing procedure now well recognized and employed, to a base 6, only one such being shown for illustrative purposes.

Each of such gauges may then be separately introduced into a Wheatstone bridge circuit, such as shown in Fig. 3 where 1 represents any one of the above gauges, and 7, 8, and 9 are balancing resistances. A galvanometer of short natural period or a cathode ray oscillograph, shown schematically at 10, and battery 11 and 12 are connected to the arms of the bridge in the conventional manner, except, however, the battery or other current source is composed of two parts 11 and 12, 11 being the usual low voltage source used in conventional bridge circuits for strain gauge use. The battery or the current source 12 is sufficient so that in addition to the source 11 an additional low but appreciable current of, for example, 50 to 500 milliamperes, may be made to flow through the resistances. The magnitude of the current is not critical except as explained below. For this purpose the battery 12 is cut into or out of the circuit by the two-pole switch 13. When any of the test gauges are introduced into the circuit, balance may be established, or the degree of imbalance recorded or compensated for in the usual manner, as, for example, by a balancing resistance, and the compensation recorded.

In the case of each of the test gauges, with balance established in the Wheatstone bridge with battery 12 cut out, the battery 12 is then cut in to the circuit for a fixed period of time, the same for all the gauges. The purpose is to pass the same current for the same period of time through all of the gauges when subjected to test. It may be desirable to introduce, in series with battery 12 and between the battery 12 and the switch 13, an adjusting resistance to be sure that the current is maintained constant for each test gauge. When such current is passed for a given time, for example, 100 milliamperes for 1 second, for a gauge having a total resistance of about 120 ohms, the switch 13 is moved to cut out the battery 12 and the degree of imbalance is immediately recorded. The response of the galvanometer should be sufficient so that the time interval between the interruption of the current and the response of the instrument be such as to permit of no appreciable temperature drop of the gauge during recording. Now assume that the gauges are such as to have a substantially zero temperature coefficient of resistance and that some of the bonded gauges show a change in resistance $\Delta R$, all substantially alike, while others show a change between $\Delta R$ and O, then one can confidently assume that the gauges of $\Delta R$ resistance have been adequately bonded and the others are partially bonded.

When such a gauge is submitted to a member to be stressed for the purpose of determining such stress, it is bonded in the usual manner. Before it is used for the purpose of determining the stress, it is introduced into a similar Wheatstone bridge circuit, as described in connection with Fig. 3, employing balancing resistances 7, 8, and 9. With battery 12 cut out the Wheatstone bridge is brought into balance as described above. Battery 12 is then cut in and the above current for the above time, as described, is passed through the gauges 1, and resistances 7, 8, and 9, and then the battery 12 is cut out and the degree of imbalance is measured immediately as described above. If the change is materially different from $\Delta R$, as described above, it is either partially bonded or entirely unbonded and the gauge should be stripped off and rebonded or not used. After rebonding, the above procedure is repeated for the newly bonded gauge to make sure it shows the above value of $\Delta R$.

It sometimes happens that a gauge is used over a prolonged period for testing of prolonged loads, or is subjected to humid or corrosive environment, and a bond originally perfect will become imperfect. In such cases in many instances it is impossible to determine whether the gauge is off or whether the stress has changed. The method and apparatus described above will permit of a periodic check of the gauge to determine whether it is reliable or whether the bond has become imperfect.

It is to be noted that for many uses the stress varies over the surface of a member to be measured, as, for example, an airplane wing. It is not possible to introduce more than one gauge in the same locality to measure localized stresses. The above method is the only method known to the applicant of assuring that the gauge is in proper working condition.

While I have described a particular embodiment of my invention for the purpose of illustration, it should be understood that various modifications and adaptations thereof may be made within the spirit of the invention as set forth in the appended claims.

I claim:

1. A method for testing the adequacy of bonding of a bonded electrical resistance wire strain gauge, which comprises attaching an electrical resistance wire strain element to a surface of an object by cementing the wire to said surface, measuring the electrical resistance of said wire, heating said wire without substantially heating the surface of said object, and again measuring the resistance of said heated wire.

2. A method for testing the bonding of electrical resistance wire strain gauges to surfaces whose strain is to be measured, which comprises bonding a plurality of similar strain gauges to a surface of an object, heating each of said wires for the same period of time by passing a current of the same magnitude through each of said gauges for like periods of time, measuring the resistance of each of said strain wire gauges after the passage of said current, measuring the resistance of a like strain gauge which is bonded to a surface by a bond whose adequacy is to be tested, passing the same current through said last-named bonded gauge for the same time as for the aforementioned bonded strain gauges, and again measuring the resistance of the strain gauge whose adequacy of bond is to be tested after the passage of said current.

3. A method for bonding of electrical resistance wire strain gauges to surfaces whose strain is to be measured, which comprises bonding a plurality of similar strain gauges of known resistance to a surface of an object, measuring the resistance of the strain wire of each of said gauges, heating each of said wires of the bonded strain gauges for the same period of time by passing a current of the same magnitude through each of said gauges for like periods of time, measuring the resistance of each of said strain wire gauges after the passage of said current, measuring the resistance of a like strain gauge bonded to a surface of an object whose strain is to be measured, passing the same current through said last-named gauge for the same time as for the aforementioned bonded strain gauges, again measuring the resistance of said strain gauge after the passage of said current, recementing said strain gauge when said resistance change is substantially different from the resistance change suffered by such of the first-mentioned strain gauges which show substantially the same resistance change after the passage of said current for said period of time, and again repeating said operations until said gauges show substantially the said resistance change.

4. An apparatus for testing the adequacy of the bonding of bonded type electrical resistance wire strain gauges when bonded to a member to be used with said gauge, comprising means connected to said bonded wire strain gauge for measuring the resistance of said gauges, means connected to said wire strain gauge for passing a heating current through said gauges, means connected to said last-named means for interrupting the passage of said heating current before said member is heated substantially, said measuring means being also adapted to measure the resistance of said gauges after the passage of said heating current without substantial change in the temperature attained by said gauges on passage of said current.

5. An apparatus for testing the adequacy of bonding of bonded type electrical resistance wire strain gauges, which comprises a bonded type of electrical resistance wire strain gauge bonded to the surface of an object, a Wheatstone bridge circuit, said gauges forming one of the legs of said Wheatstone bridge, means for measuring the resistance of said bonded gauge in said bridge, means connected to said bridge for passing a heating current through said gauge for a period of time sufficient to heat said wire gauge but insufficient to heat the surface of said object materially, and means positioned in said heating current circuit for discontinuing said passage of current and for measuring the relative resistance of said bonded gauge in said bridge after the passage of said current for said period of time.

6. In the apparatus of claim 5, a meter across one of the corners of said bridge, an adjustable potential source across the opposite corners of said bridge, and means for adjusting the potential of said potential source across the said opposite corners of said bridge.

7. In the apparatus of claim 5, a meter across the corners of said bridge, batteries in series across the opposite corners of said bridge, and a switch for disconnecting said batteries from the circuit.

8. A method for testing the adequacy of the bonding of a bonded electrical resistance wire strain gauge, which comprises attaching an electrical resistance wire strain element to a surface of an object by cementing the wire to said surface, measuring the electrical resistance of said wire, changing the temperature of said wire without materially affecting the temperature of the surface of said object, and measuring the resistance of said wire.

9. A method for testing the bonding of electrical resistance wire strain gauges to surfaces whose strain is to be measured, which comprises bonding a plurality of similar strain gauges to a surface of an object, heating each of said wires for the same period of time by passing a current of the same magnitude through each of said gauges for like periods of time, measuring the resistance of each of said strain wire gauges after the passage of said current, measuring the resistance of a like strain gauge which is bonded to a surface by a bond whose adequacy is to be tested, passing an equivalent current for an equivalent time, and again measuring the resistance of the strain gauge whose adequacy of bond is to be tested after the passage of said current.

LOUIS D. STATHAM.

REFERENCES CITED

The following references are of record in the file of this patent:

UNITED STATES PATENTS

| Number | Name | Date |
|---|---|---|
| 2,420,148 | Ostergren | May 6, 1947 |

FOREIGN PATENTS

| Number | Country | Date |
|---|---|---|
| 353,297 | Germany | Jan. 18, 1918 |

OTHER REFERENCES

Experimental Electrical Engineering by Karapetoff, John Wiley & Sons Publishers, 1908, pages 5 and 6.